United States Patent [19]
Hering, Jr.

[11] Patent Number: 5,173,194

[45] Date of Patent: Dec. 22, 1992

[54] FILTRATION METHOD AND APPARATUS HAVING A FILTRATE COLLECTION CHAMBER WITHIN THE FILTER BED

[76] Inventor: Carl J. Hering, Jr., 2920 NW. 67th Ct., Ft. Lauderdale, Fla. 33309

[21] Appl. No.: 446,119

[22] Filed: Dec. 5, 1989

[51] Int. Cl.$^5$ .................................................. B01D 24/46
[52] U.S. Cl. ...................................... 210/792; 210/807; 210/189; 210/268; 210/274; 210/291
[58] Field of Search ................................. 210/792–796, 210/675, 807, 189, 268, 269, 274–279, 285, 286, 288–292

[56] References Cited

U.S. PATENT DOCUMENTS 4,126,546 11/1978 Hjelmner et al. .................... 210/793
4,826,609 5/1989 Hensley ................................. 210/792

Primary Examiner—Ivars Cintins
Attorney, Agent, or Firm—John H. Faro

[57] ABSTRACT

A filtration apparatus includes a vertical column of filter media contained in and defined by a liquid-impervious vessel. A filtrate collection chamber is fixedly and centrally located in the media column. The collection chamber has liquid impervious top and sidewalls and an open bottom, whereby liquid to be filtered and introduced through a feed pipe at the top of the media column passes downward through the media column past the collection chamber and then upward into the collection chamber, is removed through a filtrate collection pipe. The apparatus may include equipment for continuously washing and recycling the filter media, and auxiliary alternatives for increasing the efficiency of the apparatus. Also included is the novel method for practicing the invention, particularly with the novel apparatus.

17 Claims, 2 Drawing Sheets

FILTRATION METHOD AND APPARATUS HAVING A FILTRATE COLLECTION CHAMBER WITHIN THE FILTER BED

BACKGROUND OF THE INVENTION

1. Field of the Invention

This invention relates to a novel method and appratus for the filtration of suspended solids and soluble matter, from a liquid (i.e. dispersions or an emulsion). In particular, the invention relates to an improved method and apparatus having an internal filtrate collection chamber within the filter bed.

2. Description of the Prior Art

Filtration, which is the separation of solids and liquids into two mutually exclusive fractions, is desirable in many applications. These applications include, but are not limited to, the quality improvement of drinking water, liquid discharge from municipal and industrial wastewater treatment plants to the environment, and many chemical processes involving the separation of solids and liquids.

Such needs can most economically be met by physical separation techniques. Exemplary means for such separation include a wide variety of downflow filters compressing a bed of particulate filter material contained within a vessel have been proposed and implemented for this purpose. Each of these prior filters have depended upon fixed or rigid pervious retaining devices; for example, screens, porous plates, or other type of liquid-permeable device, to retain this bed of particulate filter material and entrapped solids in place, while allowing the filtered liquid to pass through the retaining device and exit the filter. Examples of such prior downflow filters are described in U.S. Pat. Nos. 4,060,484 to E. P. Austin Et al; and my pending patent application, Ser. No. 247,397.

One of the problems of downflow filters, having an internal filtrate collection chamber, is that the pervious retaining devices are subject to clogging and blockage, which gradually restricts the flow of filtered liquid into the the filtrate collection chamber, thereby impairing filter effectiveness and efficiency. This undesirable condition may be caused by, but is not limited to, biological growth, impingement of fine filter media within the openings of the retaining device, and chemical scaling formed within the openings of the retaining device.

Remedies for overcoming these and similar problems include the removal of the filter media at regular intervals to allow periodic access to scrub the retaining devices to remove flow restrictive debris from the retaining devices. In many cases, such retaining devices may require replacement incurring additional equipment cost. In each of the aforementioned remedies, the filter must be removed from service for the repair period. Most users of downflow filters would find it desirable to use a filter that does not have a pervious retaining device and its associated problems.

OBJECTS OF THE INVENTION

An object of this invention is to provide a novel filtration method and apparatus.

A further object is to provide an improved filtration method and apparatus which employs an internal filtrate collection chamber within the filter bed.

Another object is to provide an improved downflow-type filtering method and apparatus having an internal filtrate collection chamber, but which avoids the use of pervious or porous retaining devices for the filter media.

Still another object is to provide a novel filtering method and apparatus which involves both downflow and upflow of liquid through the filter bed.

SUMMARY OF THE INVENTION

The novel filtration apparatus comprises a vertical column of filter media which is contained in and defined by a liquid impervious vessel. A filtrate collection chamber is fixedly and centrally located in the media column. The collection chamber comprises a liquid-impervious topwall attached to liquid-impervious sidewalls. The collection chamber has an open bottom. The novel filtration apparatus includes a feed pipe for introducing liquid to be filtered at the top of the media column and a filtrate collection pipe adapted to remove filtrate from the collection chamber and to deliver it outside the vessel.

During operation of the novel apparatus and the practice of the novel method, liquid to be filtered passes downward in the media column past the collection chamber, and then passes upward through the media into the collection chamber through its open bottom. Thus, the novel apparatus provides a novel method of filtration which involves both downward and upward filtration.

The preferred embodiments of the novel apparatus incorporate an air lift pump for withdrawing successive portions of the filter media from the bottom of the media column and transporting it to a position above the media column, where the media portion is separated, washed and deposited at the top of the media column. The air-lift pump includes a straight, vertical air-lift tube extending vertically from about the bottom of the media column, through the filtrate collection chamber without any communication therewith, to a position substantially above the media column. An adjustable air supply tube extending within the air-lift tube supplies air to the bottom of the air-lift tube, and air bubbles rising in the air-lift tube carry portions of the filter media, and filtered debris to the top of the tube where the filter media is processed.

During the preferred operation of the novel apparatus and the practice of the novel method, the filter media are in a constant downward movement whereby the particles of the filter media organize themselves in a favorable manner for filtration due to the variation in sizes and specific gravities of the particles, and degree of sphericity. Immediately beneath the collection chamber, the filter media forms and reforms a cone-shaped cavity which is favorable for the upward filtration of the liquid without carrying filtered debris into the collection chamber.

The preferred embodiments of the novel apparatus include one or more auxiliary filtrate pipes, each of which extends from the filtrate collection chamber to a position closely spaced from the bottom of the air-lift tube, and is adapted to carry filtrate there. By feeding limited amounts of filtrate to media around the air-lift tube, the fluidity of the media in that localized area is increased, increasing the amount of filter media transported by the air-lift pump and thereby increasing the turnover rate of the media column. The use of filtrate, and not filter feed prevents short circuiting "dirty" liquid to the filtrate collection chamber. Liquid used to wash filter media delivered by the air-lift pump includes a filtrate from the collection chamber, filtrate which has continued downward past the collection chamber, and liquid to be filtered.

The novel apparatus and novel method is intended to be used continuously in all of the above-cited features. Such continuous operation provides clean filtrate, optimum removal of solids from the filtrate, and efficient operation. In addition, the novel apparatus will provide reduced costs of manufacture and maintenance by the elimination of the costly and maintenance intensive pervious components.

DETAILED DESCRIPTION OF THE INVENTION INCLUDING THE PREFERRED EMBODIMENTS

Figure 1:
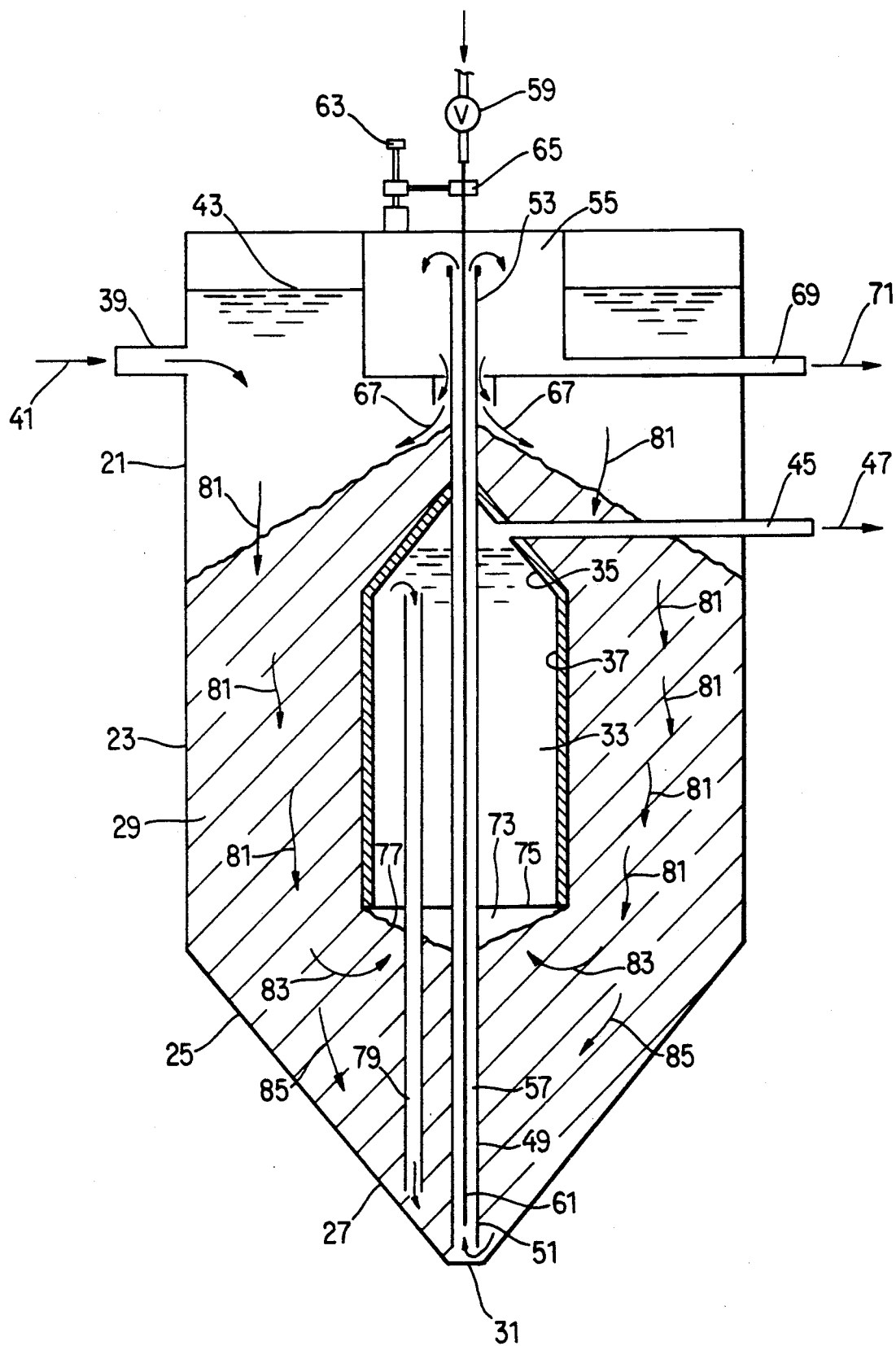
FIG. 1 is a schematic, sectional side view of a preferred embodiment of the novel apparatus adapted for practicing the novel method.

The following description of some of the preferred embodiments of the concepts of this invention is made in reference to the accompanying figures. Where an individual structural element is depicted in more than one figure, it is assigned a common reference numeral for simplication of identification and understanding.

The schematic view of the preferred embodiment shown in FIG. 1 comprises a vessel 21 having substantially cylindrical sidewalls 23 and a conical base wall 25 with the narrow end 27 of the base wall 25 facing downward. The vessel 21 contains and substantially defines a column of filter media 29 therein. The conical base wall 25 has a horizontal bottom area 31 that is centrally located therein. In this example, the vessel 21 is about 36 inches in diameter and 48 inches high, although size is a matter of design choice and other sizes may be selected over wide ranges.

The filter media is composed of particulate particles of varying size and optionally having varying specific gravities and varying degrees of sphericity including particles having ion exchange properties. The smaller-sized particles may be of a material having a greater specific weight than that of the remaining and large-sized filter media. Higher specific gravity material may be, but is not limited to, a metallic oxide.

Within the vessel 21 and geometrically-centered on plan view, is a filtrate collection chamber 33. The collection chamber 33 includes a liquid-impervious top wall or hood 35 attached to liquid impervious sidewalls 37 and has an open bottom. The collection chamber 33 is fixed in position to the inside walls of the vessel 21 with struts (not shown). As shown in FIG. 1, the sidewalls 37 are cylindrical about 12 inches in diameter and the top wall 35 is conical with the narrow end thereof facing upward.

The novel apparatus includes a liquid feedpipe 39 near the top of the vessel 21 which feeds liquid to be filtered into the vessel 21, as shown by the feed arrow 41, and maintains the top 43 of the liquid to be filtered at a height within a prescribed range. The filtered liquid or filtrate is drained from the collection chamber 33 by a filtrate collection pipe 45, as shown by the drain arrow 47.

Integrated into the novel apparatus is a means for removing successive portions of filter media from the bottom of the media column 29 in the vicinity of the bottom area 31 of the base wall 25, separating and washing the filter media, and then returning the washed filter media to the top of the media column 29. The removing means includes an air lift tube 49 which extends from a lower end 51 spaced from the bottom area 31, through the collection chamber 33 (without communication therewith) to an upper end 53 that is above the media column 29 and is located in a separation and washing device 55. An adjustable air supply tube 57 within the air lift tube 49 supplied compressed air from an outside source (not shown) through an air valve 59, which controls the amount of air being passed into the air supply tube 57. The air supply tube extends down inside the air lift tube 49 and releases air in the form of bubbles at its lower end 61.

The upward flow of air bubbles within the air lift tube 49 causes a flow in the vicinity of the bottom area 31, carrying with it liquid and portions of filter media at the bottom of the media column 29, which overflow into the separation-and-washing device. The vertical position of the air supply tube can be adjusted by rotating the screw 63 which moves the clamp 65 holding the air supply tube 61 in position. The media cleaning means 55 separates and washes the filter media which is allowed to fall by gravity to the top of the media column 29 as shown by the media arrow 67. Backwash water and debris is removed through a backwash pipe 69, as shown by the backwash arrow 71.

Because successive portions of the filter media are taken from the bottom of the media column 29 and transported to the top of the media column 29, the media column 29 is in a slow, constant downward movement of the filter media which prevents any part of the filter column from dense packing. Also, the downward movement of filter media creates a filtrate cavity 73 directly below the filtrate collection chamber 33. Thus, filtrate cavity 73 is specifically located as section within the vessel 21, adjacently beneath the collection chamber 33, is devoid of filter media, and adds to the storage capacity of the collection chamber 33. The upper boundary of this cavity 73 is formed by the lower edge 75 of the sidewalls 37 of the chamber 33. The lower boundary of this cavity 33 is a fustrum where the sloped sides 77 of the cavity intersect the air-lift tube 49. Because the sides 77 of the cavity 73 are sloped, the total area of the sloped surface of the cavity 73 is greater than the plan area of the bottom of the collection chamber.

There are one or more auxiliary filtrate pipes 79 which communicate filtered fluid in the collection chamber 33 with the bottom portion of the media column 29 by gravity. Providing additional liquid at the bottom of the media bed 29 provides adequate fluidity to the filter media. The added liquid serves as a carrier vehicle for the upward transport of the filter media in the air lift tube 49. This is particularly useful for filter media of higher specific gravity.

In the use of the novel apparatus and the practice of the novel method, liquid to be filtered is introduced through the feed pipe 39 to the upper region of the vessel 21 above the media column 29 and flows in a downward direction by gravity through the media column 29 as shown by the flow arrow 81. Since the body of the filtrate collection chamber 33 is impervious to liquid flow, the liquid being filtered passes between the walls of the vessel 21 and the collection chamber 33.

As the liquid reaches a level below the bottom 75 of the collection chamber 33, and being under pressure by the hydraulic head above, the liquid takes a path of lesser resistance and hence, the majority of the liquid turns radially toward an upward direction through the filter media under the cavity 73, as shown by the upward arrows 83, until it breaks through the sloped surface 77 of the cavity 73 and continues upward into the filtrate collection chamber 33. The filtered liquid, under hydraulic head pressure, is forced into the filtrate collection pipe 45 through which it exits the vessel 21. A small portion of the filtered liquid continues downward to the bottom of the vessel 21, as indicated by the bottom arrow 85.

The area directly below the collection chamber 33 has attributes and features of an upflow filter with the added enhancement of an increased surface area by virtue of the naturally formed sloped sides or surface 77. While the overall design of the novel apparatus is that of a downflow filter, it combines features and attributes of an upflow filter within a downflow filter.

To ensure that the upward velocity of the filtrate does not carry filter media upward into the filtrate collection chamber 33 under conditions of high rate throughout, an optional filter media of smaller particle size and of higher specific gravity may be used. Since this smaller-sized filter media is being deposited in the center at the top of the media column 29 along with the remainder of the filter media, the smaller, heavier, and less spherical filter particulates will move outwardly from the center a lesser distance that the larger, lighter, and more spherical particulates. This location of the smaller, heavier, and less spherical media grains will cause them to remain closer to the outer walls 37 of the collection chamber 33 as the particles of the media column 29 moves downward. Because the higher specific gravity material remains closest to the collection chamber walls 37, it forms that upper surface of the cavity 73 under the chamber 33. Being of a higher specific gravity, this top layer allows relatively higher upflow velocities than the remainder of the filter media of lower specific gravity.

Figure 2:
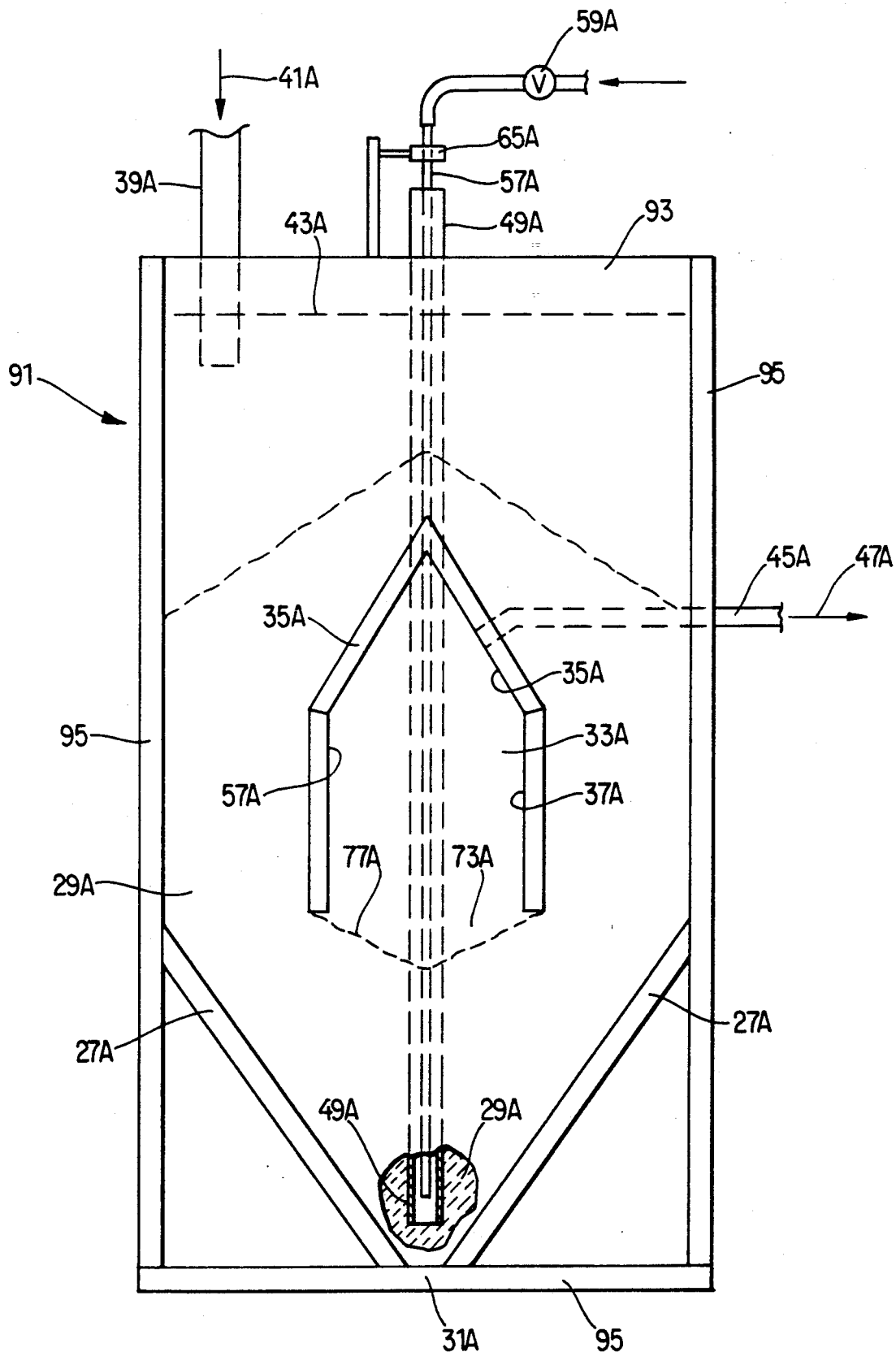
FIG. 2 is a partially broken away elevational view of a bench scale model built and operated to derive operating data for the novel apparatus and the novel method.

A bench scale model 91, depicted in FIG. 2, of the novel apparatus was constructed and operated to determine various design features and operating parameters. The model 91, which simulates a slice through the middle of a full scale apparatus, includes a front panel 93 and an opposed panel of transparent plastic sheet, spaced about four inches apart by plastic spacers 95 around the bottom and sides of the panels 93. A liquid-impervious filtrate collection chamber 33A and the conical bottom wall 27A was also formed with plastic spacers. The panels and spacers were attached to one another with suitable adhesive, as is known in the art. For simplicity of identification, structures in FIG. 2 that are similar to structures in FIG. 1 bear the same reference numeral followed by the letter "A".

The model 91 has an open top but does not include auxiliary filtrate pipes or means for washing the filter media. Because of the transparent character of the front and back panels, one can see through the model, especially through the filtrate collection chamber 33A. The model 91 also includes an adjustable air supply tube 57A inside an air lift tube 49A, a filter feed pipe 39A and a filtrate collection pipe 45A.

In a preliminary experiment, the model filter 91 was operated for about ten hours to observe movement of filter media, contamination of the filtrate collection chamber 33A and determination of the optimum location of the point of air entry into the air lift tube 49A. To this end, the filter media 29A was sand and the liquid to be filtered a colloidal suspension of a red pigment in water. The air valve 59A was opened to the desired position allowing air to bubble up the air lift tube 49A and overflow back into the filter 91. Filtrate was not withdrawn from the collection chamber 33A through the filtrate outlet pipe 45A, nor was filtrate recirculated back to the feed pipe 39A. The vertical position of the air supply tube 57A with respect to the air lift tube 49A was adjusted manually by opening the clamp 65A, positioning the air supply tube 57A and reclamping the air supply tube 57A. After ten hours of operation, the liquid in the collection chamber 33A appeared to be free of red pigment, as viewed through the panels 93. A cloudy formation in the lower portion of the collection chamber 33A and cavity 73A was silt, or other fine matter present in the sand filter media.

Following the above-described preliminary experiment, the model filter 91 was emptied of liquid and granular media. Empty of granular media, the hydraulic throughout of water was measured as follows:

| Test | Rate | Freeboard* |
|---|---|---|
| 1 | 3 gallons per 35 seconds = 5.1 gpm | 1.5 inches |
| 2 | 3 gallons per 35 seconds = 5.5 gpm | 1.5 inches |
| 3 | 3 gallons per 37 seconds = 4.7 gpm | 1.25 inches |
| 4 | 3 gallons per 36.5 seconds = 4.9 gpm | 1.25 inches |

*Freeboard is distance from top of water level to top of tank.

Filter media was added to the model filter 91 and operated by recirculating the filtrate from the filtrate outlet pipe 45A back to the feed pipe 39A. The filter media was of uncertain composition but was known to include silica and alumina particles. With a seven square inch plan area in the collection chamber 33A and filtrate drawn at the rate of 0.38 gpm (gallons per minute), the filtrate velocity was about 0.02 feet per second. This calculation is based on one gallon of filtrate collection over a time interval of 160 seconds. A slight disturbance was observed in the cavity 73A directly under the collection chamber 33A. Also, the filtrate velocity caused only several grains to raise less than one-quarter inch, but only in the immediate vicinity of the collection chamber walls. The sloped shape of the cavity 73A was maintained and the filter media did not raise into the collection of chamber 33A proper. Ensuing testing, which elevated loading rates to an excess of 5 gpm/square foot, still maintained this integrity of the process. Based on this data, a decision was made to build a working prototype about 24 inches in diameter.

The foregoing figures and descriptions thereof are provided as illustrative of some of the preferred embodiments of the concepts of this invention. While these embodiments represent what is regarded as the best modes for practicing this invention at this time, they are not intended as delineating the scope of the invention, which is set forth in the following claims.

What is claimed is:

1. A method for filtering a liquid comprising the steps of:

providing a vertical column of varying sized filter media within a liquid-impervious vessel;

providing a filtrate collection chamber in a fixed position in said media column, said chamber comprising a liquid impervious top wall and attached liquid impervious side walls, said chamber having an open bottom which allows liquid in said column to enter said chamber in an upward direction;

supplying liquid to be filtered to the upper portion of said vessel above said media column, whereby said supplied liquid passes downward through said media column past said collection chamber and then passes upward into said collection chamber; and removing filtrate from said collection chamber and said vessel.

2. The method defined in claim 1 including withdrawing successive portions of said media column using an air lift tube, transporting said portions of filter media to a separation chamber functionally connected to said air lift tube, separating and washing said portions of filter media, and depositing said washed filter media at the top of said media column.

3. The method defined in claim 2 wherein said filter media consists essentially of a mixture of particles including particles having differing physical sizes and particles having differing specific gravities; said mixture of particles providing a physical distribution for said filtering after said washed filter media is deposited at the top of said media column.

4. The method defined in column 2 including passing a minor portion of filtrate from said collection chamber to the bottom portion of said media column adjacent to said air lift tube to aid in withdrawing said portions of filter media from said column.

5. The method defined in claim 4 for continuous filtering of said liquid, said method comprising the steps of:

continuously supplying liquid to be filtered in amounts so as to effect throughput of said liquid through said media column;

continuously withdrawing successive portions of filter media from the bottom portion of said media column, transporting said media portions to said separation chamber, separating and washing said media portions, continuously depositing said washed filter media at the top of said media column;

continuously passing minor portions of said filtrate from said collection chamber to the bottom portion of said media column adjacent to said air lift tube; and continuously removing major portions of said filtrate from said collection chamber and said vessel at rates consistent with the throughput of said liquid through said media column.

6. In a down-flow filter apparatus for filtration/removal of particulate and/or soluble matter from a liquid, which apparatus includes a vertical column, a bed of filter medium contained within said column, means for introducing a liquid to be filtered at the top of said column and means for concurrently transporting a portion of the filtrate and a portion of the filter medium from the bottom region of said column to effect cleaning and regeneration of said medium, wherein the improvement comprises:

(a) a filtrate collection chamber, located within the vertical column and immersed within a bed of filter medium in said column, said collection chamber having a closed top, and closed sides, and an open bottom and further provided with means for collection of filtrate;

(b) a bed of filter medium within said column, said bed comprising particulate materials capable of removal of suspended and/or dissolved matter, and surrounding the filtrate collection chamber;

(c) a means for forming filtrate cavity with the bed of filter medium, said cavity defined, on its upper boundary by the open bottom of the filtrate collection chamber and, in its lower and lateral bounderies by the filter medium;

(d) means for introducing a liquid to be filtered into the vertical column containing the filter medium above or near the top of the bed of filter medium located within said vertical column;

(e) means for injecting a pressurized fluid, consisting essentially of a liquid, a gas, and mixtures thereof, into the vertical column containing the filter medium, said point of injection being below the level of the open bottom of the collection chamber, so as to effect localized agitation of the filter medium and thereby allow for its localized withdrawal at or near the point of injection of the pressurized fluid by medium withdrawing means;

(f) means for continuous withdrawal of a portion of the filter medium and a portion of the filtrate, from the column at or near the level of injection of the pressurized fluid, so as to effect concurrent withdrawal of filterate by the collection chamber, and of the filter medium, by medium withdrawal means from the bottom of the column to the top of the column;

(g) means for return of filter medium to the top of the bed of filter medium filter once it has been washed and contaminants removed therefrom.

7. The apparatus defined in claim 6 wherein said media column is contained in a vessel having impervious cylindrical sidewalls and a conical bottom wall with the narrow end thereof facing downward; and said filtrate chamber has impervious cylindrical sidewalls and a conical top wall with the narrow end thereof facing upward, said filtrate chamber being essentially centrally located in said media column.

8. The apparatus defined in claim 6 including means for removing successive portions of said filter media from the bottom of said column, means for successively washing said portions and means for depositing said washed portions at the top of said column.

9. The apparatus defined in claim 8 wherein said media-removing means includes an air-lift tube extending vertically through said filtrate chamber without any communication therewith, said air lift tube extending from about the bottom of said media column to a position substantially above said media column; and an adjustable air supply tube extending within said air lift tube from an output position above the bottom of said media column and the bottom of said air lift tube to an input position above said vessel.

10. The apparatus defined in claim 9 including means around the top portion of said air lift tube adapted to receive and separate the constituents of the output from said air lift tube including filter media, liquid and air, said receiving means being further adapted to deposit said filter media at the top of said media column.

11. The apparatus defined in claim 9 including at least one auxiliary filtrate pipe, each of said auxiliary pipes having an upper end in said filtrate collection chamber and adapted to receive filtrate therein, and a lower end closely spaced from the bottom of said air-lift tube and adapted to permit filtrate to discharge therefrom.

12. The apparatus defined in claim 6 wherein said media column is contained in a vessel having impervious vertical sidewalls of not less than four in number and a sloped bottom with the narrow ends thereof facing downwards; and said filtrate chamber has impervious sidewalls of not less than four in number and a sloped top with the narrow end thereof facing upward, said filtrate chamber being centrally located in said media column of plan view.

13. The apparatus defined in claim 6 wherein all or part of said media has ion exchange characteristics.

14. In a downflow filter aparatus for filtration/removal of particulate and/or soluble matter from a liquid, which apparatus includes a vertical column, a bed of filter medium contained within said column, means for introducing a liquid to be filtered at the top of said column and means for concurrently transporting a portion of the filtrate and a portion of the filter medium from the bottom region of said column to effect cleaning and regeneration thereof, wherein the improvement comprises;
   (a) a filtrate collection chamber having an open bottom, said open bottom being disposed within the bed of filter medium;
   (b) means for injecting a pressurized fluid, consisting essentially of a liquid, a gas, and mixtures thereof, into the vertical column containing the filter medium, said point of injection being below the level of the open bottom of the collection chamber, so as to effect localized agitation of the filter medium and thereby allow for its localized withdrawal at or near the point of injection of the pressurized fluid by medium withdrawing means; (c) means for continuous withdrawal of a portion of the filter medium and a portion of the filtrate, from the column at or near the level of injection of the pressurized fluid, so as to effect concurrent withdrawal of filterate by the collection chamber, and of the filter medium, by medium withdrawal means from the bottom of the column to the top of the column; and
   (d) a means for forming filtrate cavity, within the bed of filter medium, defined on its upper boundary by the open bottom of the filtrate collection chamber and its lower and lateral bounderies by the filter medium, said cavity being formed in the process of inertial compaction of the filter medium within the filter bed by the continuous withdrawal of a portion of the filter medium and a portion of the filtrate below the level of the open bottom of the collection chamber.

15. An apparatus for filtering a liquid comprising:
   a) a vessel having substantially cylindrical side walls and a conical base wall with the narrow end of said conical base wall facing downward;
   b) a vertical column of filter media contained in and substantially defined by said vessel;
   c) a filtrate collection chamber fixedly located in said vertical column of filter media, said filtrate collection chamber comprising a liquid-impervious top wall attached to liquid-impervious side walls, said filtrate collection chamber having an open bottom;
   d) a feed pipe for introducing a liquid to be filtered at the top of said vertical column of filter media, whereby said liquid passes downward through said vertical column of filter media, past said filtrate collection chamber and then upward through said vertical column of filter media into said filtrate collection chamber;
   e) a filtrate outlet pipe adapted to remove filtrate from said filtrate collection chamber and to deliver it outside said vessel;
   f) a straight vertical air lift tube within said vessel and extending from a position spaced from said conical base wall within said media column at a bottom end thereof, to a position above said media column at a top end thereof;
   g) a media cleaning means functionally connected with said top end of said air lift tube and adapted to receive the output of said air lift tube; and,
   h) an air supply tube within said air lift tube and adapted to supply air to raise portions of filter media from the bottom to the top of said air lift tube.

16. The apparatus defined in claim 15 including at least one auxiliary filtrate pipe, each of said auxiliary pipe having an upper end in said filtrate collection chamber adapted to receive filtrate therein, and a lower end closely spaced from said conical base of said vessel and adapted to permit filtrate to discharge therefrom to increase the fluidity of said filter media adjacent to said bottom end of said air lift tube.

17. The apparatus defined in claim 16 wherein said collection chamber has cylindrical sidewalls and a conical top wall with the narrow end thereof facing upward, said collection chamber being physically attached to the upper portion of said vessel.

* * * * *